United States Patent [19]

Cornett

[11] Patent Number: 4,768,208
[45] Date of Patent: Aug. 30, 1988

[54] MID-SYMBOL SAMPLING TIMING ESTIMATOR

[75] Inventor: Frank N. Cornett, Queen Creek, Ariz.

[73] Assignee: Motorola, Inc., Schaumburg, Del.

[21] Appl. No.: 23,757

[22] Filed: Mar. 9, 1987

[51] Int. Cl.$^4$ ............................................. H04L 27/22
[52] U.S. Cl. ..................................... 375/95; 375/106; 328/108; 360/51
[58] Field of Search ................... 375/106, 95, 116, 80; 360/40, 48, 51; 328/108, 109

[56] References Cited

U.S. PATENT DOCUMENTS

| | | | |
|---|---|---|---|
| 3,909,724 | 9/1975 | Spoth et al. | 375/116 |
| 4,403,193 | 9/1983 | Takemura | 328/109 |
| 4,543,530 | 9/1985 | Kovach | 328/108 |

Primary Examiner—Robert L. Griffin
Assistant Examiner—Marianne Huseman
Attorney, Agent, or Firm—Maurice J. Jones

[57] ABSTRACT

A timing error estimator which samples a received stream of data symbols at the beginning, end, and a mid-point of a symbol period is disclosed. These samples are used with a model that assumes that a data stream waveform should transition along a straight line between its values at optimum sampling instances, separated by the symbol period. Differences between a mid-symbol sample estimated using this straight line model and the actual mid-symbol sample are assumed to be due to a timing error. The timing error estimator preforms computations on complex inputs and therefore is compatible with a wide variety of modulation types.

19 Claims, 2 Drawing Sheets

MID-SYMBOL SAMPLING TIMING ESTIMATOR

BACKGROUND OF THE INVENTION

This invention relates generally to data synchronizers which attempt to optimize the synchronization of sample timing to a sequence of data symbols in a receiver portion of a modem. Specifically, the present invention relates to a timing error estimator which successfully operates on a wide variety of modulation schemes.

Various timing error estimators which work with a wide variety of modulation schemes are known. For example, a "maximum likelihood" timing error estimator represents an optimum approach to the generation of a timing error signal. In theory, the maximum likelihood method may provide acceptable results, but this method is too computationally intensive for practical use in most applications.

A "squaring" timing estimator represents another technique. This technique is based upon filtering and squaring a data stream input signal to generate a sinusoidal component with a frequency equal to the symbol rate. Timing error estimation is then accomplished by heterodyning this sinusoidal component with a local oscillator and low pass filtering. An "early/late gate" timing estimator represents yet another approach. This scheme produces a timing error estimate by integrating over two half periods of each symbol pulse, and subtracting the results. The sign of the difference is then corrected according to the polarity of the pulse.

Both the squaring and early/late gate timing estimators are less computationally intensive than the maximum likelihood timing estimator. However, each of the squaring and early/late gate timing estimators achieve undesirably poor performance results in terms of linearity and estimation noise.

SUMMARY OF THE INVENTION

Accordingly, it is an object of the present invention to provide an improved timing error estimator which is computationally efficient.

Another object of the present invention concerns providing a timing error estimator exhibiting improved output linearity and estimation noise.

Yet another object of the present invention concerns providing an improved timing error estimator which successfully operates with a wide variety of modulation techniques, including 2-PSK, 4-PSK, 8-PSK, offset QPSK, MSK, 16-QAM, 64-QAM, and 256-QAM.

The above and other objects and advantages of the present invention are carried out in one form by a device which supplies a begin-symbol sample, an actual mid-symbol sample, and an end-symbol sample. In addition, the device calculates an estimated mid-symbol sample as a function of the begin-symbol and end-symbol samples at the point in time for which the actual mid-symbol sample was measured. Then, the device computes a timing error value as a function of these begin-symbol, estimated mid-symbol, actual mid-symbol, and end-symbol samples.

BRIEF DESCRIPTION OF THE DRAWINGS

A more complete understanding of the present invention may be derived by reference to the detailed description and claims when considered in connection with the accompanying drawings wherein:

DETAILED DESCRIPTION OF THE PREFERRED EMBODIMENT

Figure 1:
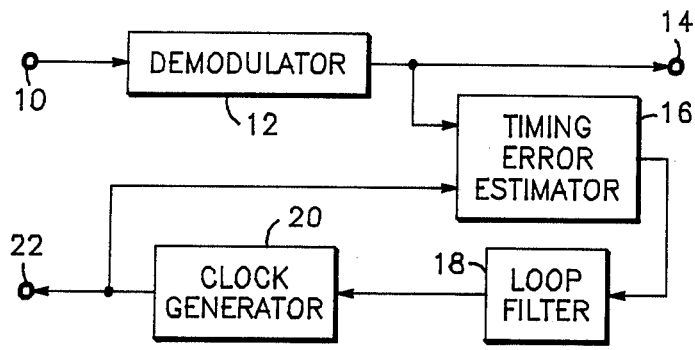
FIG. 1 shows a block diagram of a system which uses a timing error estimator.

FIG. 1 presents a block diagram which shows the use of a timing error estimator in a receiver portion of a modem. In FIG. 1, an input signal is applied at a terminal 10 which connects to an input of a demodulator 12. Demodulator 12 removes a carrier or otherwise converts the input signal to an analog output signal, or signals, whose amplitude values define the transmitted data symbols. A data symbol represents a unit of information containing one or more bits of data which are encoded for transmission and reception. Thus, a sequence of data symbols is provided by the output of demodulator 12 in the form of analog signals.

The output of demodulator 12 couples to a terminal 14 and to an input of a timing error estimator 16. A timing error value is presented in an output signal from timing error estimator 16. The output of timing error estimator 16 couples to an input of a loop filter 18, and an output of loop filter 18 couples to a control input of a clock generator 20. Clock generator 20 provides the sample timing for a modem which employs the present invention. In other words, clock generator 20 provides a signal which controls when the output from demodulator 12 is sampled. The samples are taken of the input data stream, or the output of demodulator 12, for determination of which one of a predetermined set of possible symbols is encoded into the data stream at the sampled points in time. Samples taken at optimum points in time most accurately reflect symbols encoded in the data stream.

An output from clock generator 20 couples to an output terminal 22 and to a timing input of timing error estimator 16. A control loop is formed between timing error estimator 16, loop filter 18, and clock generator 20. Thus, the timing error output value from timing error estimator 16 controls the phase and frequency of clock generator 20 so that sampling of the output signal from demodulator 12 occurs at an optimum time. For example, with increasing (or decreasing) timing error output values, clock generator 20 causes sampling of the data stream to occur earlier, which in turn causes timing error output values to decrease (or increase).

Timing error estimator 16 continues to operate throughout a transmission of data, and the phase of a signal generated by clock generator 20 which samples this data is constantly being adjusted under influence of this control loop so that an optimum sample timing is maintained.

Figure 2A:
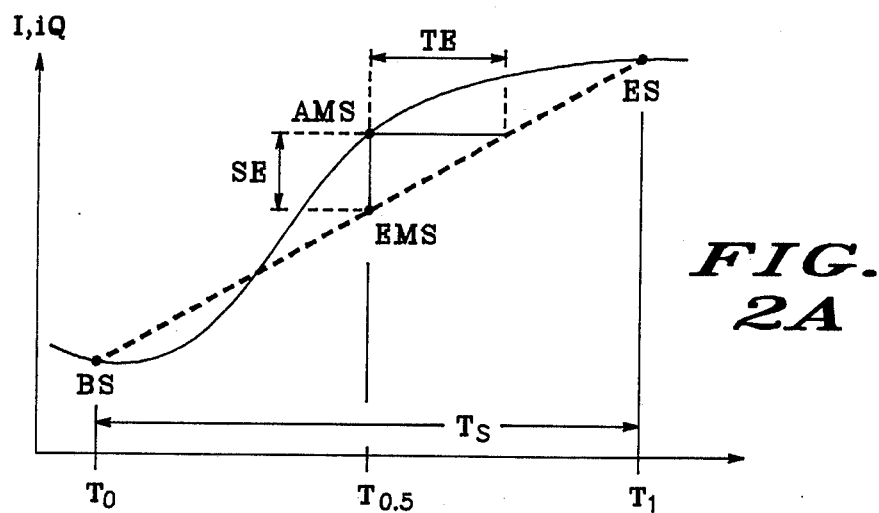
FIG. 2A shows a hypothetical timing diagram of a signal which represents a data stream as a change occurs between symbols.
Figures 2B, 2C, 2D:
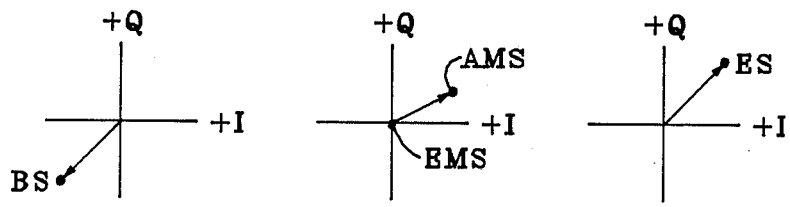
FIG. 2B shows a vector representation of the signal from FIG. 2A at a time $T_0$.
FIG. 2C shows a vector representation of the signal from FIG. 2A at a time $T_{0.5}$.
FIG. 2D shows a vector representation of the signal from FIG. 2A at a time $T_1$.

The timing diagrams shown in FIGS. 2A-2D describe the operation of the present invention. In FIGS. 2A-2D a hypothetical situation is depicted in which an input signal changes from one symbol to another. The present invention is concerned with the manner in which the input signal changes between symbols. As shown in FIG. 2A, this input signal (solid line) is sampled at a begin-symbol point in time $T_0$, as depicted at sample BS. FIG. 2B shows a vector representation of this hypothetical situation at point in time $T_0$. In this hypothetical situation, both in-phase (I) and quadrature (Q) components of sample BS exhibit negative values. However, for purposes of the present invention, the particular type of modulation is not a factor.

A symbol period is shown in FIG. 2A as $T_s$. Thus, the approximate rate which data is transmitted represents a known quantity. The next subsequent sample occurs at a point in time $T_1$, which occurs one sample period $T_s$ after time $T_0$. This sample is designated ES, for end-symbol sample, in FIGS. 2A and 2D. FIG. 2D shows the vector representation of the input signal one sample period later than the vector representation shown in FIG. 2B. In FIG. 2D both I and Q components of sample ES exhibit positive values. Accordingly, the symbol value has changed between $T_0$ and $T_1$ as shown in FIGS. 2B and 2D. In other words, the vector shown in FIG. 2B represents the immediaetly previous symbol from that shown in FIG. 2D.

The present invention operates on an a priori assumption about the manner in which the input signal changes between symbols. As represented by the dotted line in FIG. 2A, the present invention assumes that the input signal changes in a linear fashion between begin-symbol sample BS and end-symbol sample ES. In reality, the actual input signal need not make a linear transition between samples. However, empirical observations of the present invention have shown that this linearity assumption is valid on average over a large number of transitions.

Based on the assumption about the transition of the input signal between begin-symbol sample BS and end-symbol sample ES, an estimated mid-sample is computed, as shown at point EMS in FIGS. 2A and 2C. The present invention evaluates this estimated mid-symbol sample for a predetermined point in time which occurs between $T_0$ and $T_1$. In the preferred embodiment, EMS is evaluated for a point in time $T_{0.5}$ which occurs at one-half the interval between $T_0$ and $T_1$.

Additionally, the present invention measures an actual mid-symbol sample as shown at point AMS in FIGS. 2A and 2C. In this hypothetical situation point AMS does not equal point EMS, and a sampling error results. This sampling error is designated as magnitude SE in FIG. 2A.

A second assumption upon which the present invention is based is that sampling error SE is caused by a sample timing error, which is shown as time period TE in FIG. 2A. In other words, timing error estimator 16 (see FIG. 1) of the present invention "concludes" that sample timing is delayed by the time period TE from an "optimal" sample timing for the single symbol period shown in FIGS. 2A–2D.

Since timing error estimator 16 (see FIG. 1) assumes transition linearity, a slope may be computed between sample BS and sample ES. Likewise, the sample error SE may be computed from the actual mid-symbol sample and the estimated mid-symbol sample by a subtraction operation. Thus, all information may be known from which to calculate a value that corresponds to timing error TE. Consequently, timing error estimator 16 (see FIG. 1) outputs a timing error value which corresponds to time period TE. The output for the sample period shown in FIG. 2A may be produced throughout the following sample period. Furthermore, the calculation process may be repeated in the following sample time period with end-symbol sample ES from FIG. 2A serving as a begin-symbol sample in the following symbol period.

Referring to any single sample period having a begin-symbol sample and an end-symbol sample BS and ES, respectively, a consequence of the linear transition assumption described above is that an estimate of a mid-symbol sample at a point in time i may be obtained by linear interpolation, as given by:

$$EMS = BS + im \quad \text{Eq. 1}$$

Where,
$0 < i < T_s$,
m = a complex-valued slope; and
$T_s$ = the symbol period.

In equation 1, the estimated mid-symbol sample EMS and the begin-symbol sample BS are assumed to be complex, with real and imaginary parts equal to the I and Q components, respectively, of the input signal. The complex-valued slope m may be represented as:

$$m = \frac{ES - BS}{T_s} \quad \text{Eq. 2}$$

Where, ES = the end-symbol sample.

The preferred embodiment of the present invention utilizes a predetermined point in time which occurs at one-half of the interval between measurements of begin-symbol sample BS and end-symbol sample ES. In other words, i from equation 1 occurs at one-half of $T_s$. Accordingly, in the preferred embodiment estimated mid-symbol sample EMS may be represented as:

$$EMS = \tfrac{1}{2}(ES + BS) \quad \text{Eq. 3}$$

As discussed above in connection with FIGS. 2A–2D, a sample error between an actual mid-symbol sample AMS measured at the time for which the estimated mid-symbol sample is evaluated is assumed to be caused by a sample timing error. If this error is denoted as e, then $$e = Re\left(\frac{EMS - AMS}{m}\right) \quad \text{Eq. 4}$$
$$= Re\frac{\tfrac{1}{2}(ES + BS) - AMS}{m}$$

Where, Re denotes the real part.

Equation 4 contains a division operation between complex numbers. Imaginary time has no bearing on the result and may be discarded, leaving only the real portion of this division. Accordingly, the complex division may be accounted for and the timing error rewritten as:

$$e = Re\left[T_s \frac{[\tfrac{1}{2}(ES + BS) - AMS][ES - BS]^*}{|ES - BS|^2}\right] \quad \text{Eq. 5}$$

Where the superscript * denotes complex conjugation. The block diagram shown in FIG. 3 (discussed below) computes timing error by factoring equation 5 into the following components:

$$t = Re[\tfrac{1}{2}(ES+BS) - AMS]$$

$$x = Re[ES - BS]$$

$$u = Im[\tfrac{1}{2}(ES+BS) - AMS]$$

$$y = Im[ES - BS]$$

$$z = x^2 + y^2 \qquad \text{Eq. 6}$$

Except for a scale factor $T_s$, which a circuit may account for as part of overall circuit gain, using complex algebra, the error estimate e may be given by:

$$e = \frac{xt + yu}{z} \qquad \text{Eq. 7}$$

Figure 3:
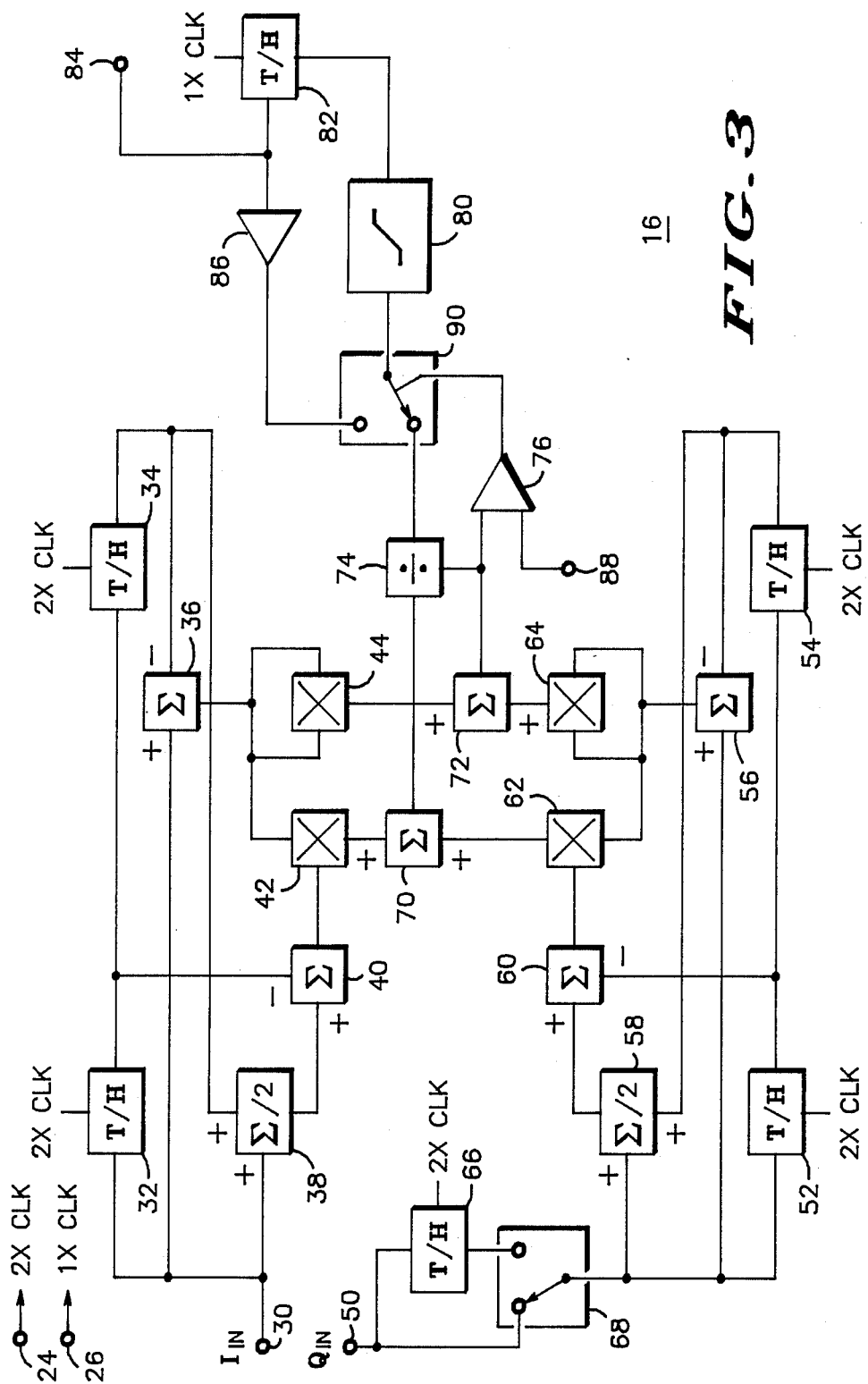
FIG. 3 shows a block diagram of a timing error estimator.

FIG. 3 shows a block diagram of a timing error estimator 16 (see FIG. 1) which performs the calculations described above. Although FIG. 2A shows a simple two-dimensional depiction of sample timing of the present invention, those skilled in the art will recognize that the majority of modulation types with which the present invention may operate utilize complex quantities. In other words, the output from demodulator 12 (see FIG. 1) represents two signals. One signal presents an in-phase (I) component, and the other signal presents a quadrature (Q) component of the received signal. Thus, the symbol contains data which has been encoded into the relative amplitude of these two signals.

Referring to FIG. 3, the I component of the received signal is applied at a terminal 30, and the Q component of the received signal is applied at a terminal 50. Terminal 30 connects to a signal input of a track and hold amplifier 32, a plus input of an adder 36 and a first plus input of an adder 38. An output of track and hold amplifier 32 couples to a minus input of an adder 40 and a signal input of a track and hold amplifier 34.

An output of track and hold amplifier 34 couples to a second plus input of adder 38 and to a minus input of adder 36. Adder 38 has an output which represents one-half of the sum of signals presented at its first and second inputs. This output of adder 38 connects to a plus input of adder 40. An output of adder 40 couples to a first input of a multiplier 42, and an output of adder 36 couples to a second input of multiplier 42. The output of adder 36 also couples to first and second inputs of a multiplier 44. Thus, multiplier 44 represents a squarer which mathematically squares a signal presented at the output of adder 36. An output of multiplier 42 couples to a first plus input of an adder 70. An output of multiplier 44 couples to a first plus input of an adder 72.

Quadrature input terminal 50 couples to a first node of a switch 68 and an input of a track and hold amplifier 66. An output of track and hold amplifier 66 couples to a second node of switch 68. A third node of switch 68 couples to a first plus input of an adder 58, a plus input of an adder 56, and a signal input of a track and hold amplifier 52. An output of track and hold amplifier 52 couples to a minus input of an adder 60 and to a signal input of a track and hold amplifier 54.

An output of track and hold amplifier 54 couples to a minus input of adder 56 and to a second plus input of adder 58. Adder 58 has an output which represents one-half of the sum of the signals presented at its first and second plus inputs. This output of adder 58 connects to a plus input of adder 60. An output of adder 60 connects to a first input of a multiplier 62. An output of adder 56 connects to first and second inputs of a multiplier 64 and a second input of multiplier 62. Thus, multiplier 64 represents a squarer which mathematically squares the signal provided by the output of adder 56. An output of multiplier 62 connects to a second plus input of adder 70, and an output of multiplier 64 connects to a second plus input of adder 72.

An output of adder 70 connects to a dividend input of a divider 74, and an output of adder 72 connects to a divisor input of divider 74 and to a first input of a comparator 76. A terminal 88, which receives a reference voltage, couples to a second input of comparator 76. An output of comparator 76 couples to a control input of a switch 90. An output of divider 74 connects to a first node of switch 90. A second node of switch 90 connects to an input of a limiter 80, and an output of limiter 80 connects to a signal input of a track and hold amplifier 82. An output of track and hold amplifier 82 connects to a terminal 84 and to a signal input of an amplifier 86. An output of amplifier 86 connects to a third node of switch 90.

A master clock signal is applied at a terminal 26. Terminal 26 couples to a track input of track and hold amplifier 82. The master clock signal provides the sample timing for a modem which uses timing error estimator 16, and is provided by clock generator 20 (see FIG. 1). This master clock signal represents the signal whose phase is controlled by the output from timing error estimator 16. This output from timing error estimator 16 is provided at terminal 84. A two-times ($2\times$) clock is provided at a terminal 24 which connects to track inputs of track and hold amplifiers 32, 34, 66, 52, and 54. The $2\times$ clock operates at twice the rate of the master clock, which is provided at terminal 26, and is synchronized with the clock provided at terminal 26 so that the $2\times$ clock transitions at substantially the same time that the master clock transitions.

Track and hold amplifier 34 supplies the real, or in-phase begin-symbol sample and track and amplifier 54 provides the imaginary, or quadrature, begin-symbol sample. Likewise, track and hold amplifiers 32 and 52 provide actual mid-symbol samples for the real and imaginary components, respectively. Additionally, at the time which the master clock signal provided at terminal 26 strobes track an hold amplifier 82, input terminals 30 and 50 provide end-symbol samples ES for real and imaginary components, respectively. Adders 36 and 56 provide differences between end-symbol and begin-symbol samples for the real and imaginary components, respectively, which are denoted as X and Y in equations 6. Then, adders 38 and 58 calculate the estimated mid-symbol sample for the real and imaginary components. And, adders 40 and 60 obtain differences between estimated and actual mid-symbol samples for real and imaginary components, respectively, which are designated as t and u in equations 6. The complex multiplication occurs through operation of multipliers 42 and 62 in connection with adder 70. Thus, the quantity $XT+YU$ is provided at the output of adder 70. The quantity Z in equation 6 is provided by squarers 44 and 64 in connection with adder 72. Finally, the division specified by equation 7 occurs in divider 74. Thus, the output of divider 74 represents an estimate of the timing error value.

Switch 90 operates under the control of comparator 76. Comparator 76 compares the value Z shown in equation 6 against a predetermined reference voltage. If the value Z is greater than this predetermined reference voltage, then the output from divider 74 is selected in switch 90 as an input to limiter 80 and as the timing error estimator output value which is routed to terminal 84.

On the other hand, if the value Z is less than the predetermined value, then switch 90 overrides the output from divider 74 by selecting the output from amplifier 86 as the output which is routed to terminal 84. The predetermined reference voltage applied at terminal 88 is selected at a relatively low value and is intended to allow comparator 76 to detect when a division by zero or near zero occurs. A division by zero represents a situation where neither the I or Q components of the input signal have significantly changed between end-symbol and the begin-symbol samples ES and BS, which are measured one symbol period apart. In this situation no timing information may be obtained. Thus, amplifier 86, which may advantageously exhibit a gain between 0 and 1, provides the output from timing error estimator 16. This permits the timing error value output from timing error estimator 16 to gradually decrease toward zero upon the occurrence of a "no transition" situation rather than cause an abrupt change which could erroneously affect the control loop shown in FIG. 1.

Switch 68 operates in conjunction with track and hold amplifier 66 in the preferred embodiment to allow timing error estimator 16 to operate with offset QPSK and MSK types of modulations. Switch 68 routes the signal presented directly at quadrature input terminal 50 to its third node when non-offset types of modulation are encountered. However, switch 68 selects the output signal from track and hold amplifier 66 when offset types of modulations occur. Track and hold amplifier 66 operates to delay the quadrature portion of the signal so that subsequent samplings of track and hold amplifiers 32, 34, 52, and 54 will be measured at substantially equivalent times.

In summary, the present invention represents a timing error estimator which is computationally efficient. Although the present invention employs a divider, as shown at divider 74 in FIG. 3, only one divider is used, and the total number of multiplications and additions is held to a relatively low number. Furthermore, those skilled in the art are able to make approximations for a division operation. One such approximation for a division operation by a quantity X substitutes multiplication by the function $1-X$ for the division operation. This and other approximations permits the present invention to operate at a more computationally efficient level, but causes the present invention to experience some degradation of performance in terms of linearity and estimation noise.

Furthermore, empirical studies of the present invention reveal that linearity and estimation noise improvements occur when compared to squaring and early/late gate timing error estimation techniques. Still further, the timing error estimator of the present invention operates in connection with a wide variety of modulation types. The present invention operates with offset and non-offset modulation types in addition to modulation schemes ranging from simple binary PSK to 256-QAM.

The present invention is described herein with reference to a particular embodiment and to particular hypothetical examples which facilitate teaching the invention. Those skilled in the art will recognize that many changes and modifications to the embodiments described herein also fall within the scope of the present invention. For example, the hardware implementation disclosed in connection with FIG. 3 may be used to accommodate symbol rates from between 500,000 to 50,000,000 symbols per second using current state of the art hardware. Those skilled in the art will recognize that the same techniques as taught herein may be applied to modems which receive data at significantly slower symbol rates using different implementation techniques. For example, at slow symbol rates some or all of the present invention may be implemented using a computer. These and other changes and modifications obvious to those skilled in the art are intended to be included within the scope of the present invention.

I claim:

1. A timing error estimator for use in synchronizing sample timing to a sequence of data symbols wherein each data symbol is delayed from an immediately previous data symbol by approximately one symbol period, said timing error estimator comprising:
    means for supplying a begin-symbol sample measured at a first point in time;
    means for supplying an end-symbol sample measured approximately one symbol period after the first point in time;
    means for calculating an estimated mid-symbol sample so that the estimated mid-symbol sample is evaluated for a predetermined point in time between measurements of the begin-symbol and end-symbol samples, said calculating means being coupled to said begin-symbol supplying means and to said end-symbol supplying means;
    means for providing an actual mid-symbol sample measured at approximately the predetermined point in time, said providing means being coupled to said end-symbol supplying means and to said begin-symbol supplying means; and
    means for computing a timing error value as a function of begin-symbol, estimated mid-symbol, actual mid-symbol, and end-symbol samples, said computing means being coupled to said providing means and to said calculating means.

2. A timing error estimator as claimed in claim 1 wherein said calculating means evaluates the estimated mid-symbol sample by linearly interpolating between begin-symbol and end-symbol samples.

3. A timing error estimator as claimed in claim 2 wherein said calculating means evaluates the estimated mid-symbol sample for a point in time that occurs substantially at one-half of the interval between measurements of the begin-symbol and end-symbol samples.

4. A timing error estimator as claimed in claim 1 additionally comprising:
    means for supplying a quadrature begin-symbol sample measured at approximately the first point in time;
    means for supplying a quadrature end-symbol sample so that the quadrature end-symbol sample is measured approximately one symbol period after the first point in time;
    means for calculating an estimated quadrature mid-symbol sample so that the estimated quadrature mid-symbol sample is evaluated for approximately the predetermined point in time, said quadrature calculating means being coupled to said quadrature begin-symbol supplying means and to said quadrature end-symbol supplying means; and
    means for providing an actual quadrature mid-symbol sample so that the actual quadrature mid-symbol sample is measured at approximately the predetermined point in time, said quadrature providing means being coupled to said quadrature end-symbol supplying means and to said quadrature begin-symbol supplying means, and said quadrature providing means and said quadrature calculating means being coupled to said computing means.

5. A timing error estimator as claimed in claim 1 wherein said computing means comprises:
  means for obtaining a difference between estimated and actual mid-symbol samples, said mid-symbol difference obtaining means being coupled to said calculating means and to said providing means; and
  means, coupled to said begin-symbol sample means and to said end-symbol sample means, for obtaining a difference between end-symbol and begin-symbol samples.

6. A timing error estimator as claimed in claim 5 wherein said computing means comprises a divider having a first input coupled to said end-symbol and begin-symbol difference obtaining means and a second input coupled to said mid-symbol difference obtaining means.

7. A timing error estimator as claimed in claim 5 additionally comprising means, coupled to said end-symbol and begin-symbol difference obtaining means, for detecting a lack of substantial change between begin-symbol and end-symbol samples.

8. A timing error estimator as claimed in claim 7 additionally comprising means, coupled to said detecting means and said computing means, for overriding the timing error value when a signal provided by said detecting means indicates the lack of substantial change between begin-symbol and end-symbol samples.

9. A method of adjusting timing synchronization of a clock generator with respect to an incoming sequence of data symbols wherein each data symbol is delayed from an immediately previous data symbol by approximately one symbol period, said method comprising the steps of:
  supplying a begin-symbol sample measured at a first point in time;
  supplying an end-symbol sample measured approximately one symbol period after the first point in time;
  calculating an estimated mid-symbol sample evaluated for a predetermined point in time between measurements of the begin-symbol and end-symbol samples;
  providing an actual mid-symbol sample measured at approximately the predetermined point in time;
  computing a timing error value as a function of begin-symbol, estimated mid-symbol, actual mid-symbol, and end-symbol samples; and
  controlling a phase parameter of a signal produced by the clock generator in response to the timing error value.

10. A method as claimed in claim 9 wherein said calculating step evaluates the estimated mid-symbol sample by linearly interpolating between begin-symbol and end-symbol samples.

11. A method as claimed in claim 10 wherein said calculating step evaluates the estimated mid-symbol sample for a point in time that occurs at substantially one-half of the interval between measurements of the begin-symbol and end-symbol samples.

12. A method as claimed in claim 9 additionally comprising the steps of:
  supplying a quadrature begin-symbol sample measured at approximately the first point in time;
  supplying a quadrature end-symbol sample measured approximately one symbol period after the first point in time;
  calculating an estimated quadrature mid-symbol sample evaluated for approximately the predetermined point in time; and
  providing an actual quadrature mid-symbol sample measured at approximately the predetermined point in time so that said computing step computes the timing error value additionally as a function of quadrature begin-symbol, quadrature estimated mid-symbol, quadrature actual mid-symbol, and quadrature end-symbol samples.

13. A method as claimed in claim 9 wherein said computing step comprises the steps of:
  obtaining a first difference between estimated and actual mid-symbol samples; and
  obtaining a second difference between the end-symbol and begin-symbol samples.

14. A method as claimed in claim 13 wherein said computing step comprises the step of dividing a first value which corresponds to the first difference by a second value which corresponds to the second difference.

15. A method as claimed in claim 13 additionally comprising the step of detecting a lack of substantial change between begin-symbol and end-symbol samples.

16. A method as claimed in claim 15 additionally comprising the step of overriding the timing error value when said detecting step indicates a lack of substantial change between begin-symbol and end-symbol samples.

17. A timing error estimator comprising:
  an input terminal;
  a first track and hold amplifier having an input coupled to said input terminal and having an output;
  a second track and hold amplifier having an input coupled to said first track and hold amplifier output, and said second track and hold amplifier having an output;
  a first adder having plus and minus inputs, said plus input being coupled to said input terminal, said minus input being coupled to said second track and hold amplifier output, and said first adder having an output;
  a second adder having a first input coupled to said input terminal, a second input coupled to said second track and hold amplifier output, and said second adder having an output;
  a third adder having plus and minus inputs, said minus input of said third adder being coupled to said first track and hold amplifier output, said plus input of said third adder being coupled to said second adder output, and said third adder having an output; and
  a first multiplier having a first input coupled to said first adder output, a second input coupled to said third adder output, and said first multiplier having an output.

18. A timing error estimator as claimed in claim 17 additionally comprising:
  a second input terminal;
  a third track and hold amplifier having an input coupled to said second input terminal and having an output;
  a fourth track and hold amplifier having an input coupled to said second input terminal and to said third track and hold amplifier output, and said fourth track and hold amplifier having an output;
a fourth adder having plus and minus inputs and an output, said plus input of said fourth adder being coupled to said second input terminal;
fifth track and hold amplifier having an output coupled to said minus input of said fourth adder;
a fifth adder having a first input coupled to said second input terminal, a second input coupled to said fifth track and hold amplifier output, and having an output;
a sixth adder having plus and minus inputs, said minus input of said sixth adder being coupled to said fourth track and hold amplifier output, said plus input of said sixth adder being coupled to said fifth adder output, and said sixth adder having an output; and
a second multiplier having a first input coupled to said fourth adder output, a second input coupled to said sixth adder output, and an output.

19. A timing error estimator as claimed in claim 18 additionally comprising:
a first squarer having an input coupled to said first adder output and having an output; and
a second squarer having an input coupled to said fourth adder output, and having an output.

* * * * *